(12) United States Patent
Cruz et al.

(10) Patent No.: US 8,919,450 B1
(45) Date of Patent: Dec. 30, 2014

(54) COLLET CONNECTION INSULATION APPARATUS (75) Inventors: Peter A. Cruz, Katy, TX (US); Terence F. Townend, Houston, TX (US); Jeffrey A. Liggett, Houston, TX (US)

(73) Assignee: Pinnacle Engineering Inc., Houston, TX (US)

(*) Notice: Subject to any disclaimer, the term of this patent is extended or adjusted under 35 U.S.C. 154(b) by 143 days.

(21) Appl. No.: 13/569,491

(22) Filed: Aug. 8, 2012

(51) Int. Cl.
*E21B 41/00* (2006.01)
*F16L 59/18* (2006.01)

(52) U.S. Cl.
CPC ............. *E21B 41/0007* (2013.01); *F16L 59/18* (2013.01)
USPC ............. 166/368; 166/338; 166/351; 285/45; 285/47

(58) Field of Classification Search
CPC ............................ E21B 41/0007; F16L 59/18
USPC ............... 166/368, 338, 351, 81.1, 93.1, 302; 138/149, 156; 285/47, 373, 419, 45
See application file for complete search history.

(56) References Cited

U.S. PATENT DOCUMENTS

| | | | | | |
|---|---|---|---|---|---|
| 968,759 | A | * | 8/1910 | Fogg | 292/307 B |
| 1,613,725 | A | * | 1/1927 | Sabin | 138/148 |
| 2,096,882 | A | * | 10/1937 | Chernosky | 166/81.1 |
| 2,137,832 | A | * | 11/1938 | Cordes | 166/81.1 |
| 4,615,543 | A | * | 10/1986 | Cannon | 285/12 |
| 5,269,572 | A | * | 12/1993 | Mefferd | 285/330 |
| 5,579,854 | A | * | 12/1996 | Barry | 175/57 |
| 7,784,547 | B2 | * | 8/2010 | Reddy | 166/360 |
| 7,823,643 | B2 | * | 11/2010 | Wong et al. | 166/302 |
| 8,006,763 | B2 | * | 8/2011 | Bath et al. | 166/338 |
| 8,540,031 | B2 | * | 9/2013 | Rimi | 166/364 |
| 2006/0266523 | A1 | * | 11/2006 | Lower | 166/346 |

* cited by examiner

*Primary Examiner* — Matthew Buck
(74) *Attorney, Agent, or Firm* — Egbert Law Offices, PLLC (57) ABSTRACT

A collet connection insulation apparatus has a frame having a first portion hingedly connected to a second portion such that the first and second portions are movable between an open position and a closed position, a first insulation section affixed to the first portion of the frame, a second insulation section affixed to the second portion of the frame, and a latch for locking the first and second portions of the frame in the closed position. The interior volume of the insulation sections is suitable for receiving the collet connection therein. The latch is slidably mounted on one portion of the frame so as to engage a sloted flange on another portion of the frame. The latch can be manipulated by a remotely-operated vehicle.

19 Claims, 7 Drawing Sheets

COLLET CONNECTION INSULATION APPARATUS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to subsea manifolds, connectors, and pipeline end terminations (PLETS). More particularly, the present invention the relates to insulation assemblies suitable for application around the collet connection associated with such subsea apparatus. More particularly, the present invention the relates to latching mechanisms for allowing the insulation apparatus to be affixed around the collet connection.

2. Description of Related Art Including Information Disclosed Under 37 CFR 1.97 and 37 CFR 1.98.

Technology advances related to subsea petroleum exploration have resulted in the development of various conduit and wellhead connector mechanisms which may be remotely controlled for the purpose of achieving connection between mechanical and hydraulic apparatus of wellheads, conduits, and the like. A popular type of connector assembly is a hydraulically-actuated collet connector which utilizes a series of segment clamps which are biased by various other mechanical apparatus to releasably secure a pair of abutting flanges into sealed assembly. Collet connectors and other acceptable connector mechanisms are generally utilized for connection of the wellhead valve system or the production system of the wellhead to lower wellhead structures so that the wellhead valve assembly may be disconnected and removed in the event that replacement or repair is necessary.

A multi-well subsea assembly can include subsea structures such as subsea trees, manifolds, and/or pipeline end terminations (PLETs). These subsea structures can be interconnected by jumpers. The jumpers mate up with the subsea structures using connectors that mate with hubs on the subsea structures. Production is often routed from the trees into gathering manifolds, and from the gathering manifolds to pipeline end terminations and pipelines to the platform.

As fluids flow from the subsea development toward the platform, the temperature of the fluids decreases, sometimes significantly, as heat is lost to the surrounding water. Measures are often taken to minimize heat lost and to keep fluid temperatures as warm as possible in order to maintain low viscosity and a proper flow of fluids within the pipelines. It is important to maintain the flow temperatures for the fluids in the event that production is shut down for any reason. In the absence of insulation, oil can slowly form hydrates at the various collet connections.

Typically, the pipeline and the piping in the PLETs, manifolds, trees, and jumpers are insulated so as to reduce heat loss to the surrounding seawater. Typically, the insulation is pre-installed on the piping before the structures are placed into the water.

The connectors on the ends of the jumpers, however, cannot be insulated prior to subsea installation. These connectors often have moving parts and mating surfaces which will require tools for installation. These features inhibit placing any sort of insulation upon the connectors. Insulation is often placed on the connectors after the connectors have been installed.

Current connector insulation systems use insulation that has been molded into a shape that conforms to the outer contours of a connector. The molded insulation may split into parts so that the insulation can be assembled upon the connector. This molded insulation can be in the form of pre-molded and/or rigid blocks. ROV's are often used to install this molded insulation upon the connector after the jumper is installed.

In the past, various patents have related to insulation systems for installation upon subsea structures. For example, U.S. Pat. No. 7,784,547, issued on Aug. 31, 2010 to S. K. Reddy, provides a subsea connector insulation device. This device has a frame coupled to and at least partially enclosing a subsea component. A bag is at least partially enclosed in the frame. The bag may substantially seal against at least one surface of the subsea component when the bag is at least partially inflated. A port is attached to the bag. The port allows the bag to be coupled to a fluid provider connector so that fluid can be provided into the bag to inflate the bag.

U.S. Pat. No. 7,823,643, issued on Nov. 2, 2010 to Wong et al., provides an insulation shroud with internal support structure. The insulation shroud includes a body adapted to be positioned around a subsea component. The body has an insulating material having an internal support structure positioned thereon, along with a door.

U.S. Pat. No. 8,006,763, issued on Aug. 30, 2011 to Bath et al., teaches a method and system for installing subsea insulation. This subsea insulation is installed on flowlines, connectors and other subsea equipment by a remotely operated vehicle. This system provides a mold designed and built to suit the parameters of the subsea item to be insulated. The mold is installed around the subsea item to be insulated and then injected with a liquid solution of insulation material. The liquid solution is then allowed to solidify so as to form a gel-molded insulation.

U.S. Patent Publication No. 2006/0266523, published on Nov. 30, 2006 to J. D. Lower, shows a subsea insulating shroud. This shroud is used to insulated a connector that connects a first tubular member having a first flange with a second tubular member that has a second flange. The apparatus has a generally tubular body forming a generally tubular cavity therein adapted to enclose the connector. The body has a longitudinal opening adapted to receive the first tubular member and a closure member for closing the opening. The body and the closure member are lined with insulation and include first and second seals for sealing with the first and second flanges so as to seal around the connector.

It is an object of the present invention to provide a collet connection insulation apparatus that provides insulation to the collet connection of a manifold or a PLET.

It is another object of the present invention to provide a collet connection insulation apparatus that maintains the temperature of the fluids flowing through the collet connection and avoids hydrate formations at the collet connection.

It is another object of the present invention to provide a collet connection insulation apparatus that is relatively inexpensive.

It is a further object of the present invention to provide a collet connection insulation apparatus that can be installed through the use of a remotely-operated vehicle.

It is a further object of the present invention to provide a collet connection insulation apparatus that can be effectively locked around the collet connection.

These and other objects and advantages of the present invention will become apparent from a reading of the attached specification and appended claims.

BRIEF SUMMARY OF THE INVENTION

The present invention a collet connection insulation apparatus that comprises a frame having a first portion hingedly connected to a second portion so as to be movable between an open position and a closed position, a first insulation section affixed to the first portion of the frame, a second insulation section affixed to the second portion of the frame, and a latching means for locking the first and second portions of the frame in the closed position. The first and second sections define an interior volume when the first and second portions of the frame are in the closed position. This interior volume is suitable for receiving the collet connection therein.

The first and second insulations sections define an opening to the interior volume when the first and second portions of the frame are in the closed position. This opening is suitable for allowing a pipe to the collet connection to extend therethrough. The first portion of the frame has a semi-circular shape. The second portion of the frame also has a semi-circular shape. The hinged connection is at a common end of the first and second portions. The first portion of the frame has a first band and a second band extending in spaced relation to the first band. The second portion of the frame has a first band and a second band in spaced relation to the first band. The first insulation section is affixed to an inner surface of the first portion of the frame. This first insulation section has a generally semi-cylindrical shape. The second insulation section is affixed to an inner surface of the second portion of the frame. This second insulation section has a semi-cylindrical shape.

The first portion of the frame has a first flange extending outwardly therefrom on a side opposite the hinged connection. The first flange has a slot extending therethrough. The latching means has a latching assembly slidably mounted at a side of second portion of the frame opposite the hinged connection. The latching assembly has a first latch pin extending therefrom. The first latch pin extends through the slot of the first flange when the first and second portions of the frame are in the closed position. The first portion of the frame has a second flange extending outwardly therefrom in generally parallel and spaced relationship to the first flange. The second flange has a slot extending therethrough. The latching assembly has a second latch pin extending therefrom. The second latch in extends through the slot of the second flange when the first and second portions of the frame are in the closed position. The first and second latch pins of the latching assembly are spaced away from the slots when the first and second portions of the frame are in the open position.

The latching means further includes a bar affixed to the second portion of the frame and extending in a vertical orientation. The latching assembly is slidable along a surface of the bar. The bar has a first hole formed therethrough. The latching means further includes a first pin fastener positioned in alignment with the first hole of the bar. The first latch pin has a receptacle formed therein. The first pin fastener is slidably movable between a retracted position in which the first pin fastener is spaced away from the receptacle of the first latch pin and an engaged position in which the first pin fastener extends through the first hole of the bar so as to be in the receptacle of the first latch pin so as to fix a position of the first latch pin. The latch pin is supported in a position above the slot of the first flange when the first pin fastener is in the engaged position.

The bar has a second hole formed therethrough in spaced relationship to the first hole. The latching means further includes a second pin fastener positioned in alignment with the second hole of the bar. The second pin fastener is slidably removable between a retracted position in which the second pin fastener is spaced away from the receptacle of the first latch pin and an engaged position in which the second pin fastener extends through the second hole of the bar so as to have an end positioned in the receptacle of the first latch pin so as to fix a position of the first latch pin in the slot of the first flange. The latching means further includes a tubular member affixed to the bar and extending outwardly therefrom. This tubular member has a slot opening through a wall of the tubular member. The tubular member has an interior aligned with the first hole of the bar. The first pin fastener extends through the interior of the tubular member. The first pin fastener has an arm extending radially outwardly therefrom. The arm is positioned so as to be manipulated by a remotely-operated vehicle (ROV) so as to be movable between the retracted position and the engaged position. The tubular member has a first cutout opening to the slot of the tubular member and a second cutout opening to the slot of tubular member in spaced relation to the first cut out. The arm of the first pin fastener is received in that first cutout when the first pin fastener is in the retracted position. The arm of the first pin fastener is received in the second cut out when the first pin fastener is in the engaged position. The latching means further includes a generally C-shaped member having one end affixed to the first latch pin and another end affixed to the second latch pin.

The latching means of the present invention further includes a first vertical plate affixed to the first flange, a second vertical plate affixed to the second flange, a third vertical plate affixed to the latching assembly, and a fourth vertical plate affixed to the latching assembly in spaced relationship to the third vertical plate. The first vertical plate abuts the third vertical plate and the second vertical plate abuts the fourth vertical plate when the first and second portions of the frame are in the closed position. The latching assembly has at least one handle extending outwardly therefrom. This handle is suitable for allowing an ROV to move the latching assembly such that the first latch pin moves into the slot of the first flange. In particular, the latching means includes a first handle affixed adjacent to one end of generally C-shaped member and extends upwardly therefrom and a second handle affixed to the another end of the generally C-shaped member and extending horizontally outwardly therefrom.

A plurality of trunnions are affixed to the frame and extending outwardly therefrom. This plurality of trunnions are suitable for receiving a sling therearound. Each of the plurality of trunnions has a lock affixed thereto. This lock is suitable for releasably retaining the sling around the trunnion.

This foregoing section is intended to describe, in generality, the preferred embodiment of the present invention. It is understood that modifications in this preferred embodiment can be made within the concept of the present invention. As such, this section is not intended, in any way, to be limiting of the scope of the present invention. The present invention should only be limited by the following claims and their legal equivalents.

DETAILED DESCRIPTION OF THE INVENTION

Figure 1:
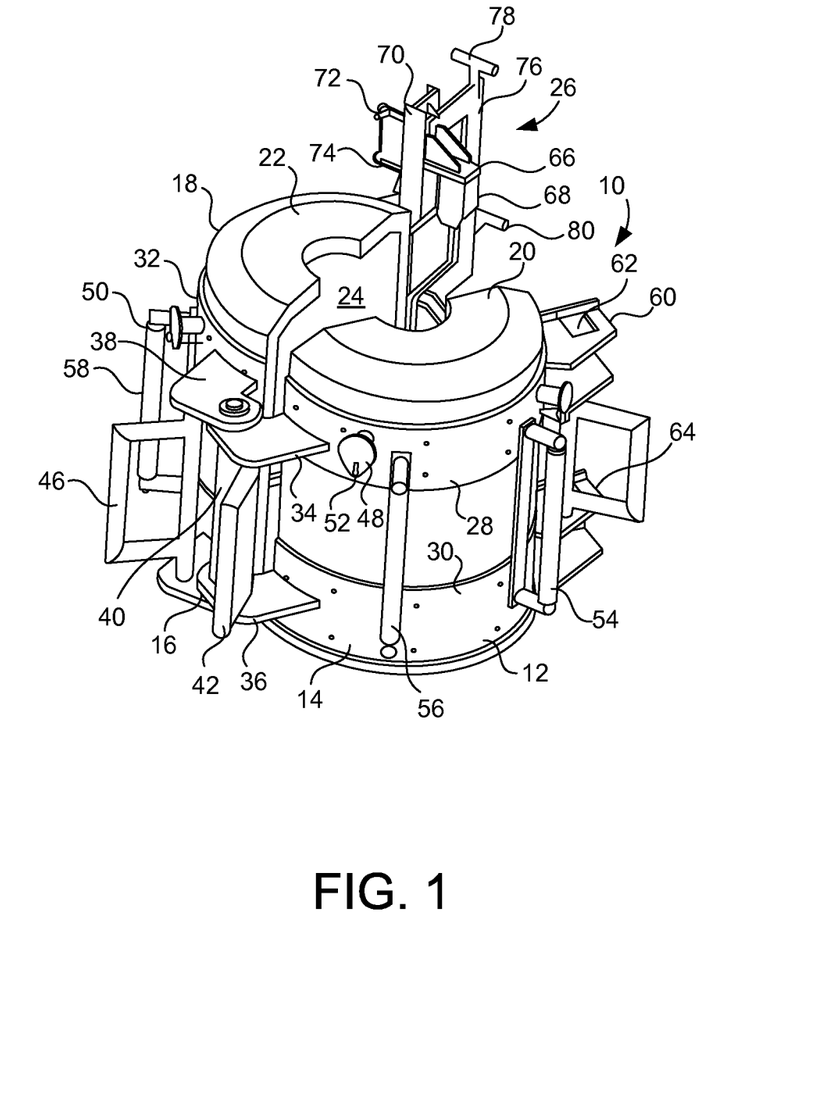
FIG. 1 is a perspective view of the collet connection insulation apparatus of the present invention as shown in an open position.
Figure 2:
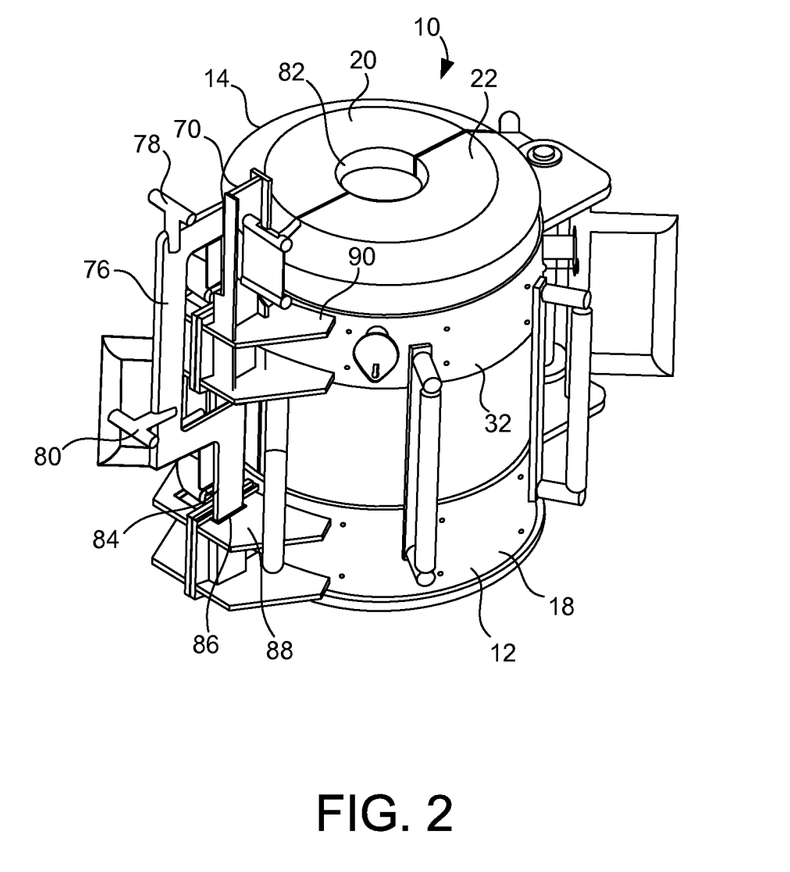
FIG. 2 is a perspective view of the collet connection insulation apparatus as shown in the closed position.

Referring to FIG. 1, there is shown collet connection insulation apparatus 10 in accordance with the preferred embodiment of the present invention. The collet connection insulation apparatus 10 includes a frame 12 having a first portion 14 connected by hinge 16 to a second portion 18. In FIG. 1, the first portion 14 is shown in an open position with respect to the second portion 18. A first insulation section 20 is affixed to the first portion 14 of the frame 12. A second insulation section 22 is affixed to the second portion 18 of the frame 12. The first insulation section 20 and the second insulation section 22 define an interior volume 24 therein. The interior volume 24 will be suitable for receiving the collet connection therein. A latching means 26 is positioned on the first portion 14 and the second portion 18 of the frame 12 so as to lock the first portion 14 with respect to second portion 18 when in a closed position (as shown in FIG. 2).

FIG. 1, it can be seen that the frame 12 has the first portion 14 extending in a generally semi-circular configuration. In particular, the first portion 14 includes a first band 28 and a second band 30 extending in spaced relationship to each other. The first insulation section 20 is of a semi-cylindrical configuration. The outer surface of the first insulation section 20 is affixed to the inner surface of each of the bands 28 and 30 of the first portion 14 of frame 12. Similarly, the second portion 18 of the frame 12 has a first band 32 and a second band (not shown) of a similar configuration to that of the first band 28 and the second band 30 of the first portion 14. The second insulation section 22 is also of a semi-cylindrical configuration and is affixed to the inner surface of each of the bands of the second portion 18 of the frame 12. As such, as the portions 14 and 18 of the frame 12 open and close, the insulations sections 20 and 22 will move correspondingly.

The hinge 16 has a surface 34 affixed to the band 28 and a surface 36 affixed to the band 30. The hinge 16 also has a portion 38 affixed to the band 32 and another similar surface affixed to the other band of the second portion 18 of frame 12. The surfaces 34, 36 and 38 can be suitably and pivotably connected to an axle 40. As such, a proper hinge connection can be achieved between the portions 14 and 18 of the frame 12. Handles 42 and 46 extend outwardly of the hinge 16 so as to allow an ROV to easily manipulate the collet connection insulation apparatus 10.

In FIG. 1, it can be seen that there are trunnions 48 and 50. Trunnions 48 and 50 are respectively mounted to the band 28 of the portion 14 and the band 32 of the portion 18. Trunnions 48 and 50 allow a sling to be looped therearound. As such, the sling can be connected to the collet connection insulation apparatus 10 so as to allow such an apparatus to be lowered to a convenient location in the water and to be suspended in order to be manipulated by the ROV. Each of the trunnions 48 and 50 includes a lock member 52 affixed thereto. Lock member 52 can be manipulated by the ROV so as to either lock the sling in place over the respective trunnions 48 and 50 or to allow for the release of such trunnions. A movement of the arm of each of the locks 52 will open the locks so as to allow the sling to be removed therefrom. Additional trunnions can be placed on the frame 12, as required.

FIG. 1 also shows that there are sacrificial anodes 54, 56 and 58 affixed to the frame 12. Sacrificial anodes 54, 56 and 58 avoid the deterioration of the material associated with the frame 12.

The latching means 26 has a unique configuration in the present invention. As can be seen in FIG. 1, there is a first flange 60 that is affixed to the frame 12 at an end of the frame 12 opposite the hinge 16. The flange 60 has a slot 62 formed therethrough. Another flange 64 is affixed to the frame 12 and extends in parallel spaced relationship to the first flange 60. The second flange 64 will have a similar slot extending therethrough.

The latching means 26 includes a latching assembly 66 that is slidably supported on the second portion 18 of the frame 12 at an end of the portion 18 opposite the hinge 16. The latching assembly 66 includes a first latch pin 68 extending downwardly therefrom. In normal use, the first latch pin 68 can be lowered in order to engage the slot 62 of the first flange 60. Another latch pin will be associated with the latching assembly 66 adjacent to the flange 64. A bar 70 extends in a generally vertical orientation at the end of the second portion 18 opposite the hinge 16. The bar 70 provides a surface in which the latching assembly 66 can slide in a vertical direction. Suitable pin fasteners 72 and 74 are cooperative with respective holes (to be described hereinafter) in the bar 70 so as to assure the fixing of the latching assembly 66 in either an upper position or a lower position. In an upper position, the latch pin 68 will be spaced away from the slot 62 of the flange 60 so as to allow the portions 14 and 18 of the frame 12 to be separated from each other in the open position. When the latch pin 68 is released, the latching assembly 66 will lower such that the latch pin 68 will engage with the slot 62 of the flange 60 so as to lock the portions 14 and 16 together. The latching assembly 66 has a generally C-shaped member 76 that is connected the latch pin 68. A first handle 78 extends vertically upwardly from the C-shaped member 76. Another handle 80 extends horizontally outwardly of the C-shaped member 76.

FIG. 2 shows the collet connection insulation apparatus 10 in a closed configuration. As can be seen, the first insulation section 20 is closed upon the second insulation section 22 so as to define the interior volume 24. A circular opening 82 is formed by the closure of the insulation sections 20 and 22. Hole 82 allows a pipe associated with the collet connection to extend therethrough. The lower end of the insulation sections 20 and 22 will also have a similar hole formed therein.

FIG. 2, the C-shaped member 76 is particularly illustrated. The C-shaped member 76 has a portion 84 that is slidably received within a slot 86 formed on a flange 88 extending from the second portion 18 of frame 12. This will allow the C-shaped member 76 to travel in a vertical orientation. The handle 78 extends upwardly from the C-shaped member. Similarly, the handle 80 will extend horizontally outwardly of the C-shaped member 76. The bar 70 is affixed to a flange 90 affixed to the band 32 of the second portion 18 of frame 12.

Figure 3:
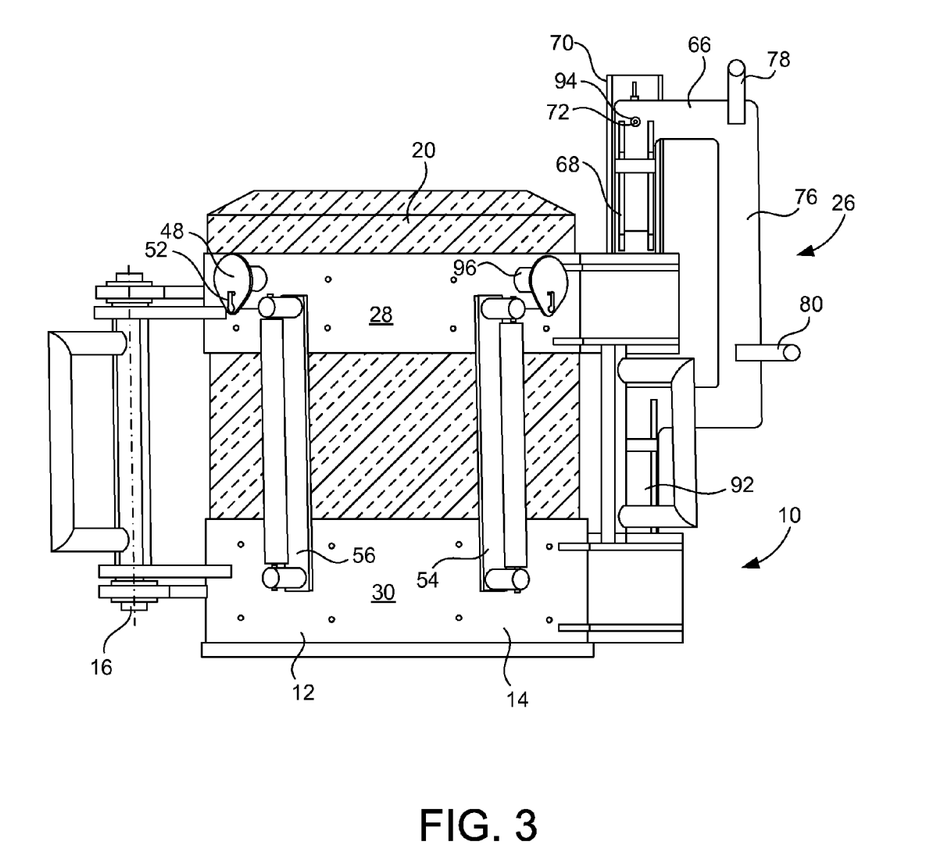
FIG. 3 is a side elevational view of the collet connection insulation apparatus of the present invention.

Referring to FIG. 3, there is shown a side elevational view of the collet connection insulation apparatus 10 of the present invention. In particular, it can be seen that the frame 12 has the first portion 14. The first portion 14 includes a first band 28 and a second band 30. Sacrificial anodes 54 and 56 are affixed to the bands 28 and 30 and extend therebetween. The sacrificial anodes 54 and 56 serve to combat the electrolytic effects of the sea water upon the material used for the frame 12. The hinge 16 is located at one side of the frame. The latching means 26 is located at the opposite end of the frame 12 from the hinge 16.

The latching means 26 is illustrated as having the C-shaped member 76 extending so as to have the first latch pin 68 at one end and the second latch pin 92 at the opposite end. The latching assembly 66 is illustrated in its upper position or unlatched configuration. The bar 70 extends vertically upwardly. The pin fastener 72 is engaged with a receptacle 94 formed in the first latch pin 68. As such, the latching assembly 66 is retained in its upper unlatched position by the pin fastener 72. The handle 78 extends vertically upwardly from the C-shaped member 76 adjacent the first latch pin 68. The handle 80 extends horizontal outwardly of the C-shaped member 76 adjacent the second latch pin 92. The handles 78 and 80 are suitable for manipulation by an ROV.

FIG. 3, the trunnions 48 and 96 are positioned on the first band 28 of first portion 14 of frame 12. Each of the trunnions 48 and 96 include a lock 52 thereon. Lock 52 includes an am that can be manipulated by a ROY so as to release the lock and allow a sling to be released from the respective trunnions 48 and 96.

In normal use, the collet connection insulation apparatus 10 can be lowered by affixing slings around the trunnions 48 and 96 (along with the other trunnions). The collet connection insulation apparatus 10 will be lowered into the water in the closed configuration (as illustrated in FIG. 2). When the apparatus 10 is located adjacent to the collet connection, the latching means 26 is raised so as to allow the ports 14 and 18 to move to the open configuration (as illustrated in FIG. 1). The insulation sections 20 and 22 can be then placed around the collet connection. The ROV will close the portions 14 and 18 together back to the closed configuration (as illustrated in FIG. 2). The pin fastener 72 can then be released from the hole 94 so that the latching means 26 can be suitably lowered such that the latch pins 68 and 92 will engage the respective slots of the respective flanges extending from the first portion 14 of the frame 12. As such, the apparatus 10 will be retained in a locked configuration around the collet connection. The locks 52 associated with each of the trunnions can then be released so that the sling can be released from the trunnions and return to the surface.

Figure 4:
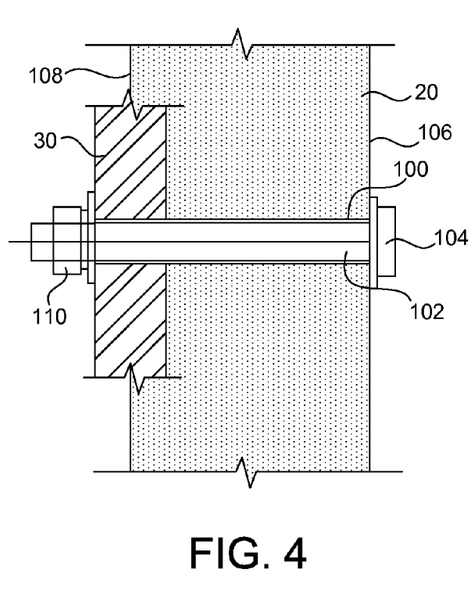
FIG. 4 is an cross-sectional view showing the connection between the frame and the insulation of the collet connection insulation apparatus of the present invention.

FIG. 4 shows the connection between bands 30 and the insulation section 20. As can be seen, there is a hole 100 that extends through the insulation section 20. A bolt 102 extends through the hole 100 so as to have head 104 protruding along an inner surface 106 of the insulation section 20. The band 30 will reside against an outer side 108 of the insulation section 20. A nut 110 can then be tightened upon the threaded portion of the bolt 100 so as to urge the band 30 into dose engagement against the surface 108 of the insulation section 20. The other bands associated with the frame 12 can similarly be applied to the insulation sections 20 and 22 in a similar manner.

Figure 5:
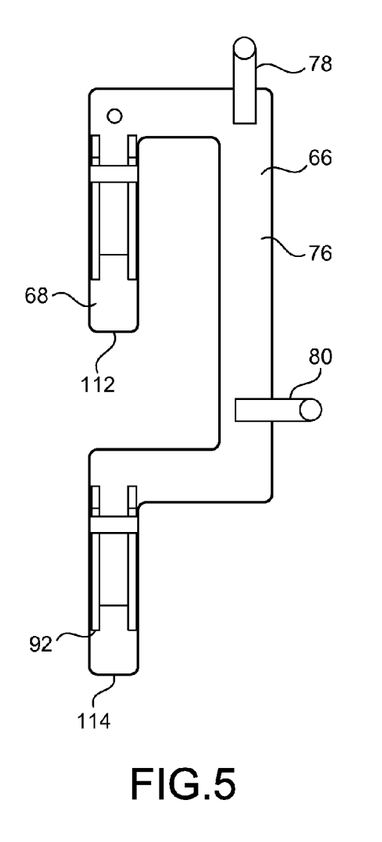
FIG. 5 is a side elevational view showing the latch pins and C-member of the latching assembly of the present invention.

FIG. 5 shows an isolated view of the latching assembly 66. The latching assembly 66 includes a C-shaped member 76 having the first latch pin 68 extending downwardly therefrom extending downwardly therefrom. The bottom edge 112 of the first latch pin 68 and the bottom edge 114 of the second latch pin 92 have suitably rounded or tapered edges so as to facilitate the insertion of the latch pins 68 and 92 into the respective slots of the flanges. The handle 78 extends upwardly from the C-shaped member. The handle 80 extends horizontally outwardly of the C-shaped member 76.

Figure 6:
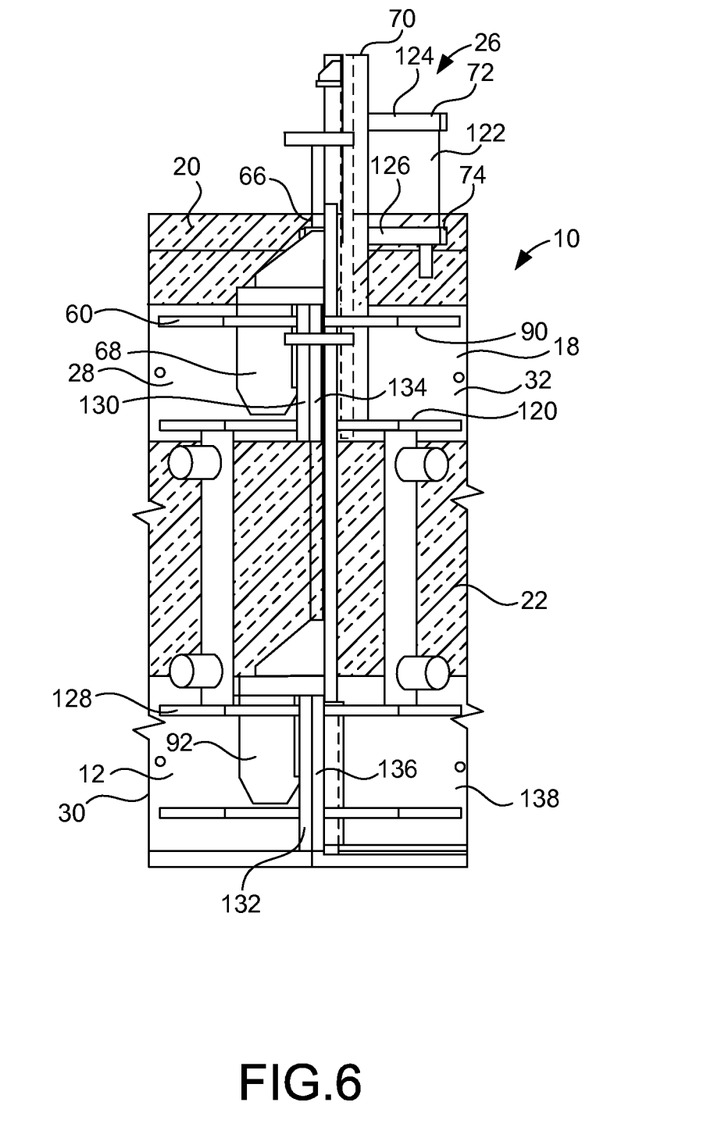
FIG. 6 is an end view showing the latching assembly of the present invention as in a locking position.

FIG. 6 is a detailed view showing the latching means 26 of the present invention. The latching means 26 is illustrated in FIG. 6 in the locked position. As can be seen, the bar 70 extends vertically upwardly from the second portion 18 of the frame 12. Flanges 90 and 120 affix the bar 70 in a proper position above the band 32 of the frame 12. The bar 70 has a first pin fastener 72 and a second pin fastener 74 cooperative therewith. A panel 122 extends between the tubular member 124 associated with the pin fastener 72 and the tubular member 126 associated with the pin fastener 74. When the pin fastener 74 extends through a hole in the bar 70, it will engage a corresponding receptacle on the latching assembly 66 so as to fix the latching assembly 66 in the locked configuration.

The first latch pin 68 extends through the slot 62 formed in the flange 60. Similarly, the second latch pin 92 extend through a slot in another flange 128. Flanges 60 and 128 are illustrated in spaced parallel relationship to each other. The second flange 128 is supported on the band 30 of frame 12. Similarly, the flange 60 is supported on the band 28 of frame 12.

Since the pin fastener 72 has been released from the latching assembly 66, the latching assembly 66 can be easily lowered into the position shown in FIG. 6. Once the latching assembly 66 has been lowered to this position, the pin fastener 72 is pushed through a hole in bar 70 so as to engage with a receptacle on the latching assembly 66.

The vertical plates 130 and 134 will abut each other when the apparatus 10 is in the closed position. Similarly, the plates 132 and 136 will abut each other in this dosed position. As such, a tight engagement between the insulation sections 20 and 22 is achieved.

Figure 7:
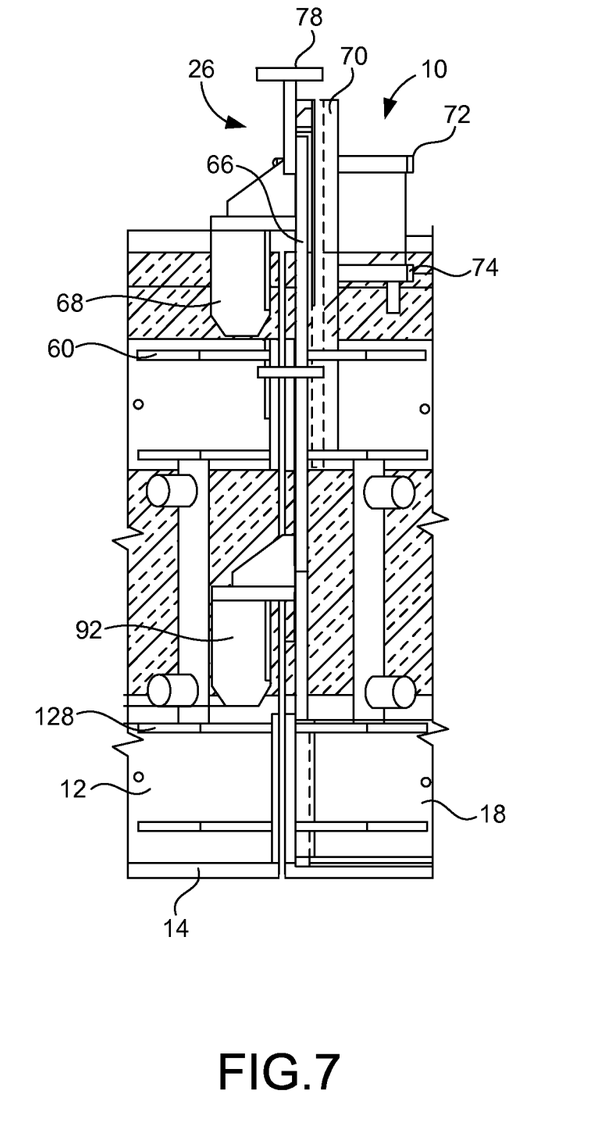
FIG. 7 is an end view of the collet connection insulation apparatus of the present invent showing the latching assembly in a retracted position.

FIG. 7 shows the latching means 26 in its upper position so as to allow for the opening of the collet connection insulation apparatus 10. In FIG. 7, the pin fastener 72 is extended through a hole in the bar 70 so as to engage a receptacle in the latching assembly 66. As such, the first latch pin 68 will be retained in a position above and spaced away from the slot in the flange 60. Similarly, the second latch pin 92 is retained in a position spaced above the slot in the flange 128. The second pin fastener 74 is released from the hole so as to allow the latching assembly 66 to be lifted upwardly by the use of the handle 78. In this configuration, the first portion 14 of the frame 12 an be separated from the second portion 18 of frame 12.

Figure 8:
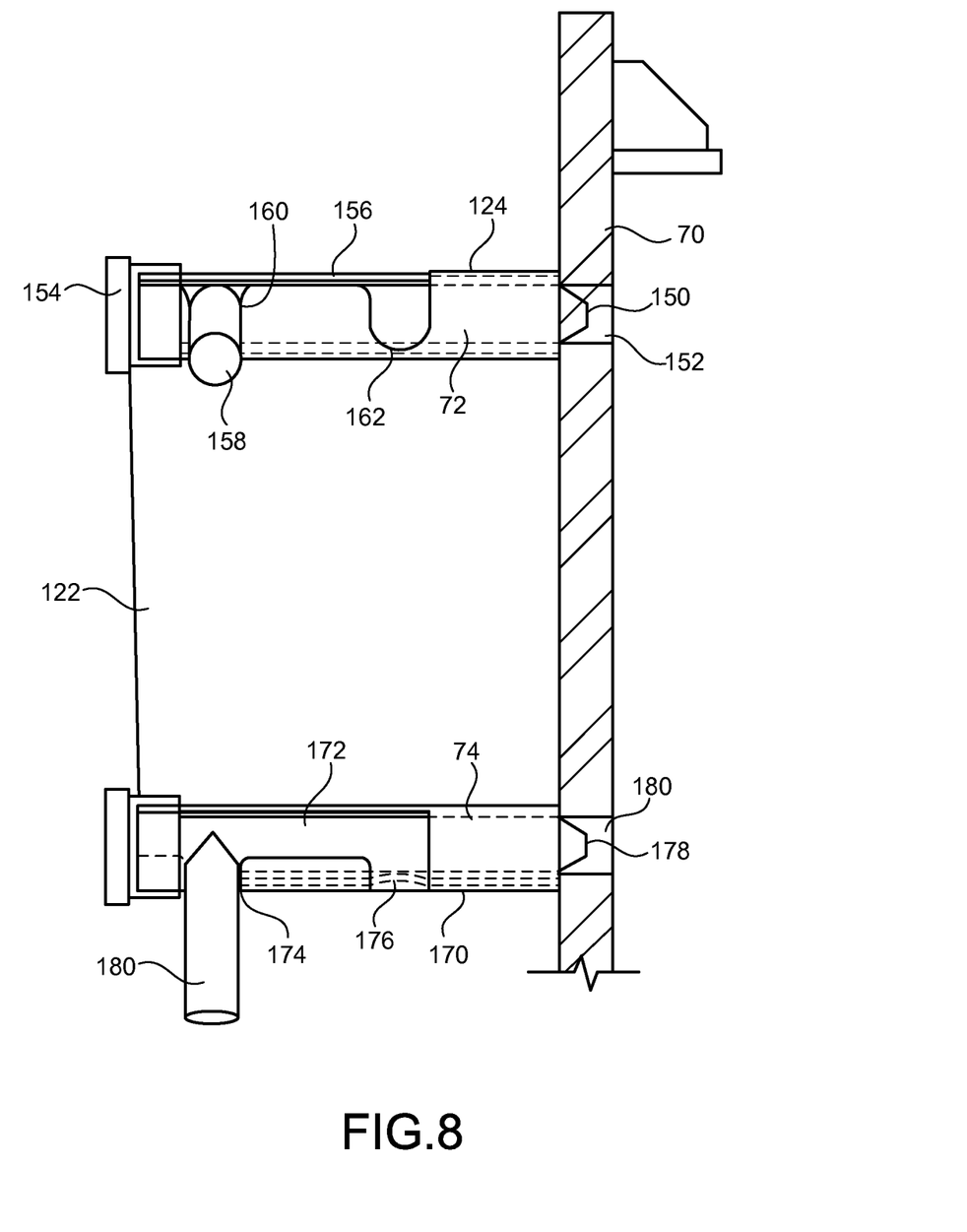
FIG. 8 is a detailed view showing the pin fasteners as used in the latching assembly of the collet connection insulation apparatus of the present invention.

FIG. 8 is an isolated view showing the configuration of the pin fasteners 72 and 74 associated with the present invention. The panel 122 extend between the pin fasteners 72 and 74. In particular, the pin fastener 72 is slidably received within a first tubular member 124. The pin fastener 72 has a tapered end 150 that extends through a hole 152 formed in the bar 70. A stop 154 is affixed to the end of the tubular member 124. The tubular member 124 has a slot 156 formed therein. An arm 158 is affixed to the pin fastener 72 and extends outwardly therefrom. Arm 158 is suitable for allowing manipulation by the arm of an ROV. A first cutout 160 is formed in the tubular member 128. A second cutout 162 is formed in the tubular member 72. Each of the cutouts 160 and 162 open to the slot 156. The cutout 160 is in spaced relationship to the cutout 162.

In normal use, when it is desired to move the pin fastener 72 from the retracted position (as shown in FIG. 8), the ROV will grasp the arm 158, lift the arm 158 so that the arm 158 emerges from the cutout 160 into the slot 156, and then move the arm 158 toward the second cutout 162. The arm 158 can then be lowered into the cutout 162 so as to lock the pin fastener 72 in an extended position. The extended position will extend through the hole 152 of the bar 70 so as to engage with the corresponding receptacle formed on the latching assembly 66.

Similarly, the second pin fastener 74 is slidably received within a tubular member 170. Tubular member 170 has a slot 172 extending partially along the length thereof. The slot 170 has a first cutout 174 and a second cutout 176 in a different orientation than the cutouts 160 and 162 of the first pin fastener 72.

The second pin fastener 74 is illustrated in the retracted position in which the head 178 extends partially into the hole 180 formed in the bar 70. In order to move the pin fastener 74 from the retracted position to the extended position, the ROV will grasp the arm 182 so as to pivot the arm 182 upwardly toward the slot 174. The arms 180 along with the connected second pin fastener 74 will slide along the slot 172. The arm 180 can then be moved back into the cutout 176 so as to lock the pin fastener 74 in an extended position. This extended position will assure that the latching assembly lock the respective lock pins in the respective slots of the flanges.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A collet connection insulation apparatus comprising:
   a frame having a first portion hingedly connected to a second portion such that said first and second portions are movable between an open position and a closed position, said first portion of said frame having a first flange extending outwardly therefrom opposite the hinged connection, said first flange having a slot extending therethrough;
   a first insulation section affixed to said first portion of said frame;
   a second insulation section affixed to said second portion of said frame, said first and second insulation sections defining an interior volume when said first and second portions of said frame are in said closed position, said interior volume suitable for receiving a collet connection therein; and
   a latching assembly slidably mounted at a side of said second portion of said frame opposite the hinged connection, said latching assembly having a latch pin extending therefrom, said latch pin extending through said slot of said first flange when said first and second portions of said frame are in said closed position.

2. The collet connection installation apparatus of claim 1, said first and second insulation sections defining an opening to said interior volume when said first and second portions of said frame are in said closed position, said opening suitable for allowing a pipe to the collet connection to extend therethrough.

3. The collet connection installation apparatus of claim 1, said first portion of said frame having a semi-circular shape, said second portion of said frame having a semi-circular shape, the hinged connection being at a common end of said first and second portions.

4. The collet connection installation apparatus of claim 3, said first portion of said frame having a first band and a second band extending in spaced relation to said first band, said second portion of said frame having a first band and a second band in spaced relationship to said first band of said second portion of said frame.

5. The collet connection installation apparatus of claim 3, said first insulation section affixed to an inner surface of said first portion of said frame, said first insulation section having a semi-cylindrical shape, said second insulation section affixed to an inner surface of said second portion of said frame, said second insulation section having a semi-cylindrical shape.

6. The collet connection installation apparatus of claim 1, said first portion of said frame having a second flange extending outwardly therefrom in generally parallel relation to said first flange, said second flange having a slot extending therethrough, said latching assembly having a second latch pin extending therefrom, said second latch pin extending through said slot of said second flange when said first and second portions of said frame are in the closed position.

7. The collet connection installation apparatus of claim 6, said first and second latch pins of said latching assembly being spaced away from said slots when said first and second portions of said frame are in said open position.

8. The collet connection installation apparatus of claim 1, said latching assembly further comprising:
   a bar affixed to said second portion of said frame and extending in a vertical orientation, and latching assembly slidable along a surface of said bar.

9. The collet connection installation apparatus of claim 8, said bar having a first hole formed therethrough, said latching assembly further comprising:
   a first pin fastener positioned in alignment with said hole of said bar, said first latch pin having a receptacle formed therein, said first pin fastener being slidably movable between a retracted position in which said first pin fastener is spaced away from said receptacle of said first latch pin and an engaged position in which said first pin fastener extends through said first hole of said bar so as to have an end positioned in and said receptacle of said first latch pin so as to fix a position of said first latch pin.

10. The collet connection installation apparatus of claim 9, said latch pin being supported in a position above said slot of said first flange when said first pin fastener is in said engaged position.

11. The collet connection installation apparatus of claim 9, said bar having a second hole formed therethrough in spaced relation to said first hole, said latching assembly further comprising:
   a second pin fastener positioned in alignment with said second hole of said bar, said second pin fastener being slidably movable between a retracted position in which said second pin fastener is spaced away from said receptacle of said first latch pin and an engaged position in which said second pin fastener extends through said second hole of said bar so as to have an end positioned in said receptacle of said first latch pin so as to fix a position of said first latch pin in said slot of said first flange.

12. The collet connection installation apparatus of claim 9, said latching assembly further comprising:

a tubular member affixed to said bar and extending outwardly therefrom, said tubular member having a slot opening through a wall of said tubular member, said tubular member having an interior aligned with said first hole of said bar, said first pin fastener extending through said interior of said tubular member, and said first pin fastener having an arm extending radially outwardly therefrom, said arm being positioned so as to be manipulated by a remotely operated vehicle so as to cause said first pin fastener to be movable between said retracted position and said engaged position.

13. The collet connection installation apparatus of claim 12, said tubular member having a first cutout having an end opening to said slot of said tubular member and a second cutout opening to said slot of tubular member in spaced relation to said first cutout, said arm of said first pin fastener received in that first cutout when said first pin fastener is in said retracted position, said arm of said first pin fastener received in said second cutout when said first pin fastener is in said engaged position.

14. The collet connection installation apparatus of claim 6, said latching assembly further comprising:
a generally C-shaped member having one end affixed to said first latch pin and another end affixed to said second latch pin.

15. The collet connection installation apparatus of claim 6, said latching assembly further comprising:
a first vertical plate affixed to said first flange;
a second vertical plate affixed to said second flange;
a third vertical plate affixed to said latching assembly; and
a fourth vertical plate affixed to said latching assembly in spaced relationship to said third vertical plate, said first vertical plate abutting said third vertical plate and said second vertical plate abutting said fourth vertical plate when said first and second portions of said frame are in said closed position.

16. The collet connection installation apparatus of claim 1, said latching assembly having at least one handle extending outwardly therefrom, the handle suitable for allowing a remotely-operated vehicle to move said latching assembly such that said first latch pin moves into said slot of said first flange.

17. The collet connection installation apparatus of claim 14, said latching assembly further comprising:
a first handle affixed adjacent to said one end of generally C-shaped member and extending upwardly therefrom; and
a second handle affixed adjacent to said another end of said generally C-shaped member and extending horizontally outwardly therefrom.

18. The collet connection installation apparatus of claim 1, further comprising:
a plurality of trunnions affixed to said frame and extending outwardly therefrom, said plurality of trunnions suitable for receiving a sling therearound.

19. The collet connection installation apparatus of claim 18, each of said plurality of trunnions having a lock affixed thereto, said lock suitable for releasably retaining the sling around the trunnion.

* * * * *